United States Patent [19]

Hawkins et al.

[11] Patent Number: 4,694,137
[45] Date of Patent: Sep. 15, 1987

[54] LASER WELDING HEAD FOR SLEEVE-TO-TUBE WELDING

[75] Inventors: Phillip J. Hawkins; William H. Kasner, both of Penn Hills Township, Alleghney County; Richard A. Miller, North Huntingdon, all of Pa.

[73] Assignee: Westinghouse Electric Corp., Pittsburgh, Pa.

[21] Appl. No.: 821,674

[22] Filed: Jan. 23, 1986

[51] Int. Cl.⁴ .............................................. B23K 26/00
[52] U.S. Cl. ..................... 219/121 LC; 219/121 LQ; 219/121 LR
[58] Field of Search .................. 219/121 LC, 121 LD, 219/121 LQ, 121 LR

[56] References Cited

FOREIGN PATENT DOCUMENTS 0224092 12/1983 Japan ............................. 219/121 LU
0107785 6/1984 Japan ............................. 219/121 LQ Primary Examiner—C. L. Albritton
Attorney, Agent, or Firm—D. M. Satina

[57] ABSTRACT

A laser welding head for welding a sleeve within a tube by fusing the interface between the sleeve and tube with a laser beam. The laser welding head has a cylindrical housing adapted to be inserted inside of the sleeve, a focusing lens for focusing a laser beam transmitted through the housing, and a welding mirror for directing the focused beam out of the housing and into contact with the sleeve. The welding mirror is maintained a predetermined distance from the inside surface of the sleeve and a motor and drive assembly are used to rotate the welding head within the sleeve. Shield gas is supplied to the welding head and passes about the periphery of the focusing lens for cooling the focusing lens and the welding mirror before being discharged into contact with the weld area. A recessed aperture is provided within the discharge outlet to prevent molten material from the weld site from splattering into the housing and onto the mirror or lens. Multiple pass welds are preferred for attaching each end of the sleeve to the tube with the preferred weld paths being either multiple discrete weld paths or continuous overlapping helical weld paths at each end of the sleeve.

24 Claims, 19 Drawing Figures

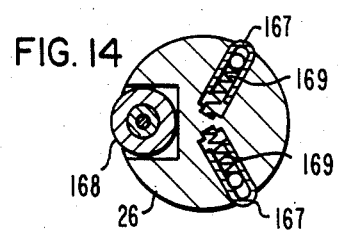
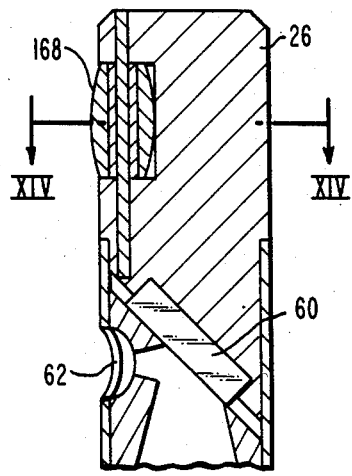
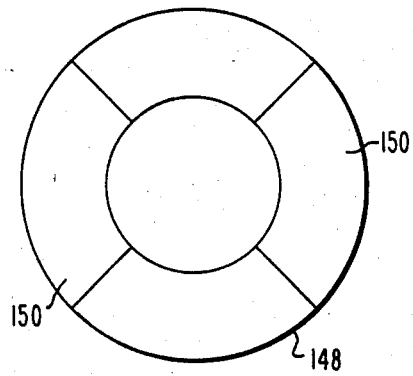
FIG. 7
FIG. 13
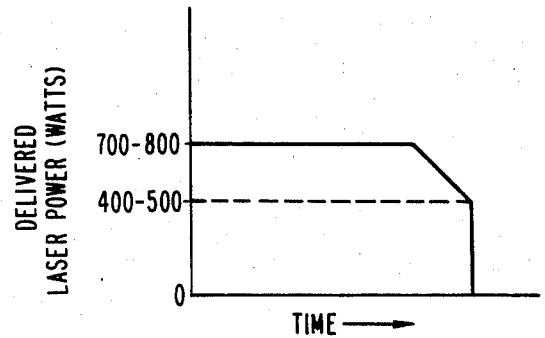
FIG. 15

LASER WELDING HEAD FOR SLEEVE-TO-TUBE WELDING

CROSS-REFERENCE TO RELATED APPLICATIONS

This application is related to copending applications Ser. No. 821,673, filed herewith in the names of W. H. Kasner et al. and entitled "Laser Beam Alignment and Transport System" and the Ser. No. 821,678, filed herewith in the names of W. H. Kasner et al. and entitled "Laser Welding of a Sleeve Within A Tube", both of which are assigned to the Westinghouse Electric Corporation.

BACKGROUND OF THE INVENTION

This invention relates to welding apparatus and more particularly to welding apparatus for welding a sleeve within a tube using a laser beam.

In tube-type heat exchangers, a first fluid flows through the tubes of the heat exchanger while a second fluid surrounds the outside of the tubes such that heat exchange occurs between the two fluids. Occasionally, one of the tubes can become defective such that a leak occurs therein which allows the fluids to mingle. When this occurs, it is sometimes necessary to either plug the tube so that the fluid does not flow through the tube or repair the tube, thereby preventing leakage from the tube.

In nuclear reactor power plants, the tube-type heat exchangers are commonly referred to as steam generators. When a defect occurs in a tube of a nuclear steam generator that allows the coolant in the tube to mingle with the coolant outside of the tube, a more significant problem arises. Not only does this situation create an ineffective heat exchanger, but it also creates a radioactive contamination problem. Since the fluid flowing in the tubes of the nuclear steam generator is generally radioactive, it is important that it not be allowed to leak from the tubes and contaminate the fluid surrounding the tubes. Therefore, when a leak occurs in a nuclear steam generator heat exchange tube, the heat exchange tube must either be plugged or repaired so that the coolant does not leak from the tube. This prevents contamination of the fluid surrounding the tubes.

There are several methods known in the art for repairing heat exchange tubes; however, many of these methods are not applicable to repair of heat exchange tubes wherein the tube is not readily accessible. For example, in a nuclear steam generator the physical inaccessibility of defective heat exchange tubes and the radioactive nature of the environment surrounding the heat exchange tubes present unique problems to repairing heat exchange tubes that do not normally exist in other heat exchangers. For these reasons, special methods have been developed for repairing heat exchange tubes in nuclear stem generators. Typically, the method used to repair a heat exchange tube in a nuclear steam generator is one in which a metal sleeve having an outside diameter slightly smaller than the inside diameter of the defective tube is inserted into the defective tube and attached to the defective tube to bridge the defective area of the tube. This type of repair method is generally referred to as "sleeving". Previous sleeving development work has been concerned with obtaining a relatively leakproof joint between the sleeve and the tube by brazing, arc welding, explosive welding, or other joining means. Due to the need for cleanliness, close fittings, heat application, and atmospheric control, these metallurgical bonding techniques have problems which are not easily solvable in areas such as a nuclear steam generator where human access is limited.

In the braze sleeving methods such as the one described in U.S. patent application Ser. No. 790,010, filed Oct. 22, 1985, in the name of W. W. Cheng and entitled "Improved, Continuous Movement Brazing Process", which is assigned to the Westinghouse Electric Corporation, it is necessary to heat a braze metal to its melting point in order to form the braze bond between the sleeve and tube. One way to heat the braze material is by inserting a heating apparatus, such as the one described in U.S. patent application Ser. No. 720,107, filed Apr. 4, 1985 in the name of W. E. Pirl et al. and entitled "Improved Braze Heater Assembly and Method", which is assigned to the Westinghouse Electric Corporation, inside the sleeve within the tube. This process utilizes specially made sleeves provided with a recess containing braze material, careful expansion of the portion of the sleeve containing the braze material into contact with the tube wall, and precise positioning of the heating apparatus within the sleeve at the site of the braze material, all of which are hampered by the inaccessibility of the work area.

Welding methods for internally welding sleeves to tubes in heat exchangers require specially designed welding equipment. One such apparatus is described in U.S. Pat. No. 4,510,372, which issued Apr. 9, 1985, in the name of R. M. Kobuck et al. and is entitled "Sleeve-To-Tube Welder", which is assigned to the Westinghouse Electric Corporation. With such a device, care must be taken to avoid arc piercing the sleeve and tube.

Laser welding is an attractive alternative to arc welding and brazing for joining metals since it is faster and produces a smaller heat affected zone. However, spatial constraints have heretofore prevented the use of laser welding for sleeve-to-tube welding of nuclear steam generator tubes due to the bulkiness of lasers capable of delivering sufficient power for welding. The invention described herein presents a method and apparatus for such welding.

SUMMARY OF THE INVENTION

The invention is a laser welding head apparatus for welding a sleeve within a tube by fusing the interface therebetween with a laser beam. The laser welding head apparatus comprises a cylindrical housing means adapted to be inserted within the sleeve and having an opening in one end thereof, a discharge outlet means in a side thereof, and a hollow portion extending axially from the opening in communication with the discharge outlet, a focusing means mounted within the hollow portion of the housing means between the opening and the discharge outlet means for focusing a laser beam directed through the hollow portion, and a welding mirror means mounted within the hollow portion of the housing means proximate the discharge outlet means for reflecting a focused laser beam through the discharge outlet means and into contact with the sleeve for fusion of the sleeve to the tube. The laser welding head also includes focal distance maintaining means for maintaining the welding mirror means a predetermined distance from the inside surface of the sleeve and weld head rotating means for rotating the cylindrical housing means to circumscribe a path about the inner surface of the sleeve for joining the sleeve to the tube by fusing the interface therebetween.

The laser welding head further comprises a shield gas flow path means for directing shield gas through the housing means and discharging the gas through the discharge outlet means into contact with the sleeve to shield the weld area. The discharge outlet means has a recessed discharge aperture means to prevent metal melted by the laser beam from splattering through the discharge outlet means and onto the mirror means, the discharge outlet means opening substantially conically outwardly from the recessed aperture means to distribute the shield gas over the weld area. The shield gas flow path means includes gas flow passage means about the periphery of the focusing means for causing the shield gas flowing through the housing means to contact the focusing means for cooling purposes.

The laser welding head further comprises a base having a beam directing mirror means adjustably attached thereto for accepting a laser beam transmitted thereto and for redirecting the beam substantially through the center of the tube. The focal distance maintaining means includes a ball plunger means mounted about the periphery of the housing means axially in line with the discharge outlet means and a spring-loaded pins toggle arm means for maintaining the ball plunger means in contact with the inner sleeve wall, the ball plunger means being fixedly mounted with respect to the radius of the housing means to position the outer edge of the discharge outlet means a predetermined distance from the inner wall of the sleeve, thereby maintaining the welding mirror means a predetermined distance from the inner sleeve wall. The weld head rotating means includes a motor means with a drive shaft, the drive shaft having a drive gear fixedly attached thereon for rotation therewith, the drive gear meshing with the driven gear fixedly attached to the cylindrical housing means for rotation of the housing means when the motor means rotates the drive shaft.

The laser welding head apparatus also includes axial positioning means for axially positioning the housing means to the weld areas.

One of the preferred embodiments of the laser welding head apparatus includes an axial translating means for continuously translating the housing means as it is rotated within the sleeve, the translating means acting to move the housing means a distance less than the width of the weld path in each rotation of the housing means, the translating means creating an overlapping helical weld path between the sleeve and tube. An alternative embodiment of the laser welding head apparatus includes an axial translating means which axially translates the housing means a predetermined distance within the sleeve for causing the weld head apparatus to weld along a second discrete weld path adjacent the first weld path.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

FIG. 7 is an elevational view of the preferred annular detector or wander ring;

FIG. 13 is an elevational view of the top portion of an alternative welding head;

FIG. 14 is a cross-sectional plan view taken along the line XIV—XIV in FIG. 13 which depicts an alternative focal distance maintaining means;

FIG. 15 is a chart depicting the delivered laser power as a function of time;

DESCRIPTION OF THE PREFERRED EMBODIMENT

Figure 1:
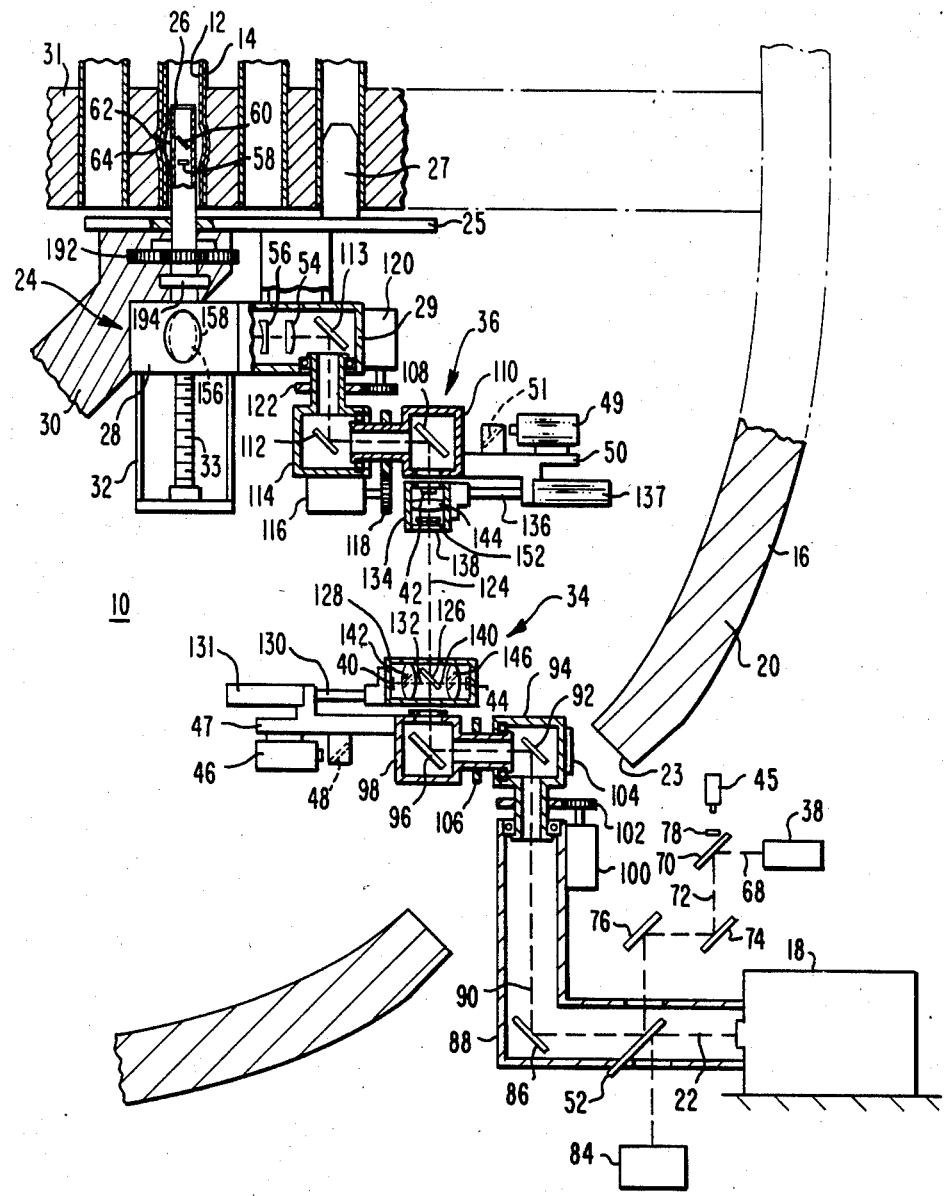
FIG. 1 is a schematic view in elevation of the laser welding apparatus as mounted within the steam generator with parts broken away.

FIG. 1 illustrates schematically the preferred embodiment of the laser welding system 10. The next several paragraphs provide an overview of the system and are followed by a more detailed description of each component thereof.

Referring now to FIG. 1, a typical nuclear steam generator comprises a tube bundle containing several thousand tubes 14, the ends of only four of which are shown in for clarity. The sleeve-to-tube laser welding system 10 must be capable of accessing tubes 14 at various locations about the tubesheet 31 of the steam generator for welding a sleeve therein to repair defects. However, the high-power laser 18, which may be a $CO_2$ laser of at least 500 W and preferably 800 W, is too bulky to be inserted into the channelhead 20. Therefore, the laser 18 may be positioned outside the channelhead, the high-power laser beam 22 may be fed into the channelhead 20 through a manway 23, and a laser beam transport system may be used to direct the high-power laser beam 22 from the laser 18 to the remote welding head 26. While many forms of transport systems are suitable for directing the beam to the remote welding head 26, the system depicted in FIG. 1 is preferred since it does not restrict the range of tubes accessible by the welding head.

The beam transport system depicted in FIG. 1 directs a high-power laser beam 22 from a laser beam transmitting means, such as beam transmitter 34, to a remote laser beam receiving means, such as beam receiver 36, with no physical connection therebetween. A laser beam alignment system is used to align the components of the beam delivery system to direct the beam along an optimum beam path and to receive the beam at the required angle of incidence. The laser alignment system also insures that the high-power beam does not improperly impinge on any components of the beam delivery system or of the steam generator to prevent damage which could thereby result. For initial rough alignment purposes, the preferred laser beam alignment system employs a low-power HeNe laser 38 or another source of visible light, low-power beam detectors 40, 42, and 44, and several video cameras 45, 46, and 49 or other visual observation devices. Next, a partial beam reflector an intensity reducer means, such as beam reducer 52, is positioned in front of the high-power laser 18 for alignment thereof using high-power beam- detectors which cannot withstand prolonged direct contact with the high-power beam.

Once the laser 18 is actuated, a high-power laser beam 22 is directed to a laser beam transmitter 34 which sends the beam to a remote laser beam receiver 36. The diameter of the beam is reduced by lenses 54 and 56 and the beam is redirected within base portion 29 upward to welding head 26 within tube 14. The beam is focused by a focusing means, preferably lens 58, and directed out of the head by a mirror means, preferably mirror 60, through discharge outlet 62. The beam 22 melts material from sleeve 12 and fuses the interface 64 between the tube 14 and sleeve 12. Rotation of the head 26 by motor 66 results in a weld which creates a leak-tight seal between the sleeve 12 and the tube 14. Each of the major components of the laser welding system will be discussed in more detail hereinafter.

The Laser Beam Alignment and Transport System

The Laser Beam Alignment and Transport System, which is shown in FIG. 1, aligns a high-power laser beam 22 from a high power laser 18 for transmission to and reception by remote beam receiver 36 from which the beam is directed to a remote laser welding head 26 positioned within tube 4 into which a sleeve 12 is to be welded. Since the laser 18 employed is a high-power laser, preferably in the range of 400 to 800 watts, improper alignment of the high-power beam 22 could cause it to contact and damage components of the alignment and transport system or the steam generator. A multi-step alignment system is preferred using first a visible beam from a low-power laser, such as a HeNe laser, then the high-power beam after it has passed through a beam intensity reducer.

Figure 2:
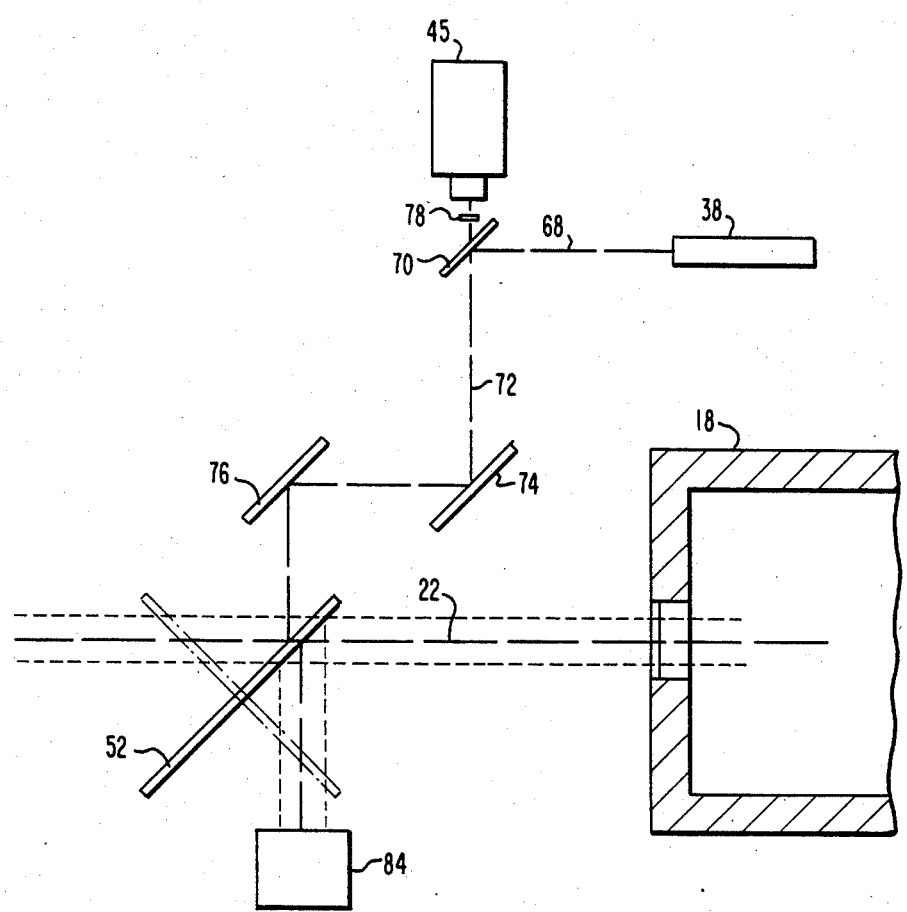
FIG. 2 is a schematic view of the apparatus used to align the low-power laser with the high-power laser.

FIG. 2 depicts the preferred apparatus used to direct a visible beam from a low-power laser 38 along the high-power laser beam path 22 for use in aligning the high-power laser 18. In this embodiment, the low-power laser beam 68 first contacts pellicle means, such as pellice 70, which reflects a portion, preferably about 50 percent, of the beam along a second path 72. The remaining beam portion then is reflected by steering mirrors 74 and 76 into contact with the partial beam reflector and intensity reducer 52. A viewing means, such as a video camera 45, is positioned to view the low-power beam 68 through pellicle 70, which appears semi-transparent to the light from the low-power laser 38, for adjustment of pellicle 70 for reflection of beam 68 along the proper path 72 for redirection by beam reflector 52 along the path of high-power beam 22. A small opaque disk 78 is positioned between pellicle 70 and video camera 45 to block any low-power laser radiation scattered by pellicle means 70 toward video camera 45.

Figure 3:
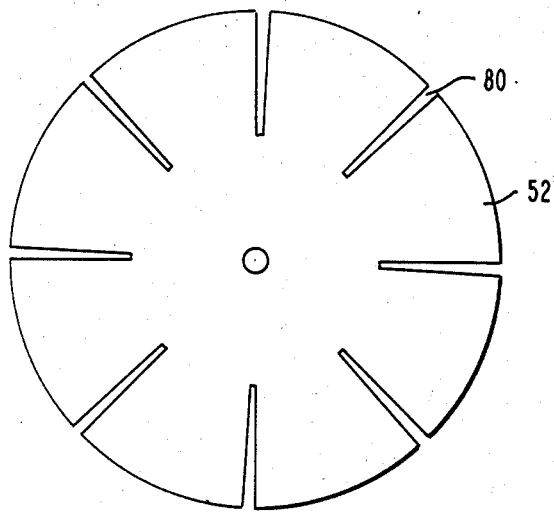
FIG. 3 is an enlarged elevational view of one of the preferred embodiments of the partial beam reflector and intensity reducer of FIG. 2.
Figure 4:
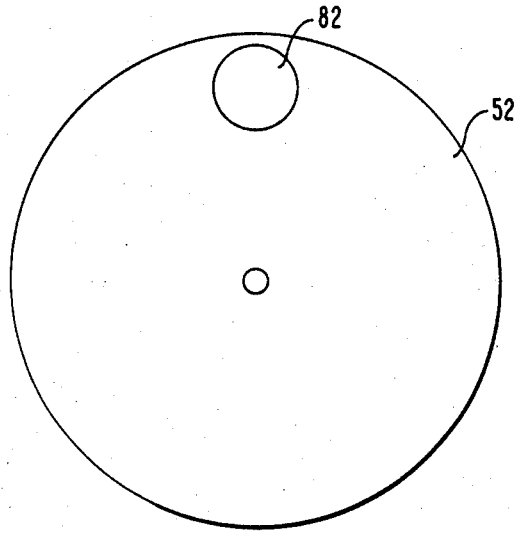
FIG. 4 is an enlarged elevational view of another preferred embodiment of the partial beam reflector and intensity reducer of FIG. 2.

Two possible embodiments of the partial beam reflector and intensity reducer 52 are presented in FIGS. 3 and 4. In each embodiment, both sides of the beam reducer are reflective. In addition to reflecting the beam from the low-power laser 38 along the path of the high-power beam 22, the beam intensity reducer 52 is also used to decrease the magnitude of the high-power beam to a level safe for alignment purposes. For reducing the intensity of the high-power beam, the beam intensity reducer 52 is positioned in the path of the high-power beam and is rotated by a motor (not shown). A high-power laser beam 22 will pass through slot means, preferably similar to slots 80, of the intensity reducer 52 of FIG. 3 and through the aperture means, preferably a single aperture 82, of intensity reducer 52 of FIG. 4 when they are aligned with the beam path. When the slots 80 and aperture 82 are rotated out of the beam path, the beam strikes the reflective surface of intensity reducer 52 and is directed harmlessly to a conventional beam dump 84.

The magnitude of laser beam power passing through intensity reducer 52 is dependent upon the size and orientation of the slots 80 and aperture 82. The preferred range of net transmission is between 5 and 10 percent. The intensity reducer 52 of FIG. 3 is preferably provided with eight slots 80 positioned 45 degrees apart and subtending an angle of 3 degrees each. Therefore, a beam passes through intensity reducer 52 during 24 degrees of the 360 degree rotation for a net transmission of 6.7 percent. For an 800 W laser, the reduced magnitude transmitted is about 54 W.

FIG. 4 illustrates the preferred beam intensity reducer 52. The slots 80 of FIG. 3 are herein replaced by a single aperture 82 large enough to pass the entire beam. The average transmission of this intensity reducer 52 is about 7 percent. The intensity reducer of FIG. 4 is preferred since it need not be removed from the beam path during welding as is required of the intensity reducer depicted in FIG. 3. The aperture 82 is merely aligned with the path and the beam can pass unimpeded therethrough.

Other beam intensity reducer geometries are possible, including multiple apertures and variously sized and oriented apertures and slots. Also, more than one reducer could be used in series.

Figure 5:
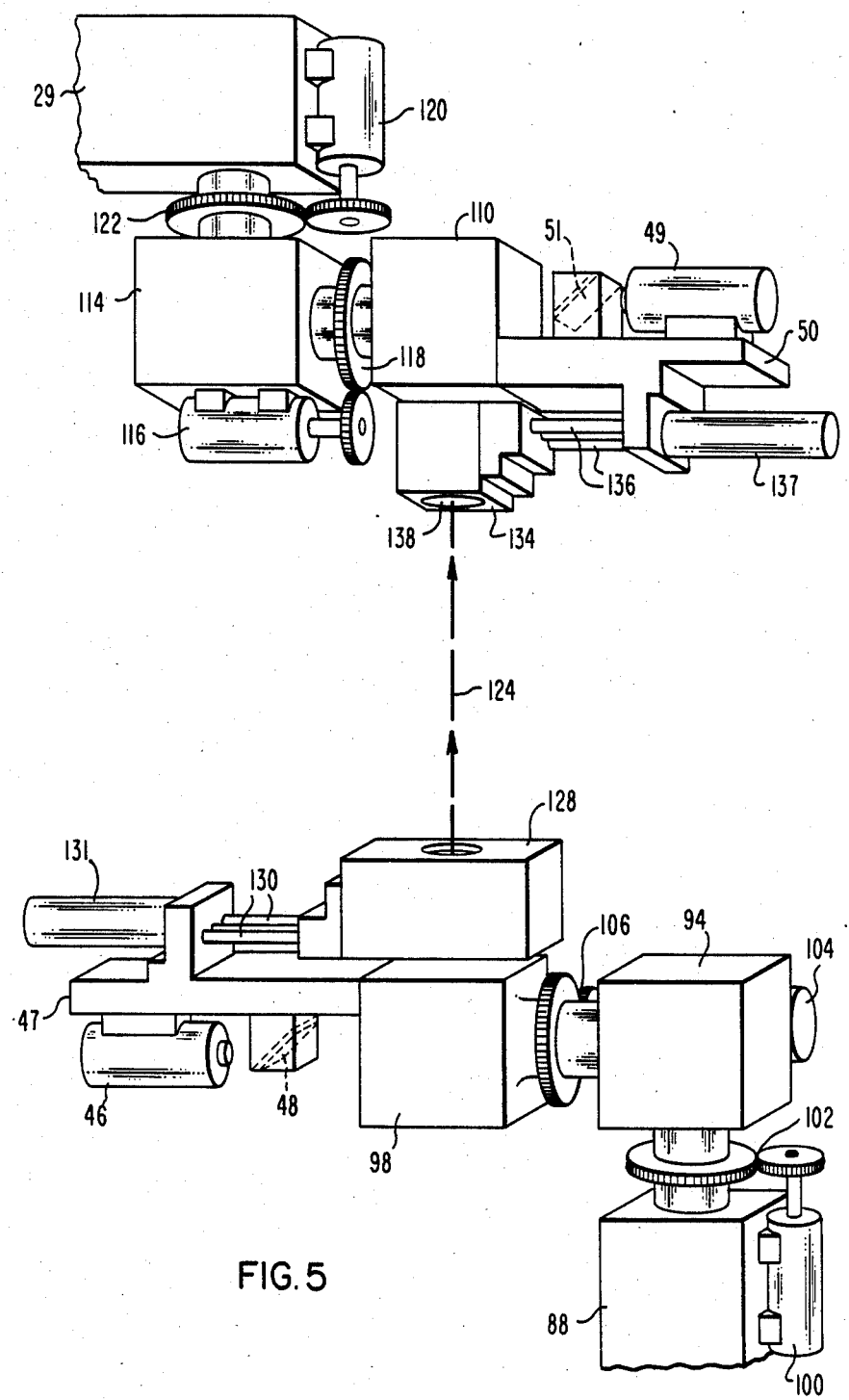
FIG. 5 is an elevational view in perspective of the preferred beam transmitter and beam receiving means.

A reflective means, such as mirror 86, within stationary housing 88 directs any high or low power beam from the beam path 22 to the beam transmitter 34 along path 90. The preferred embodiments of beam transmitter 34 and remote beam receiver 36 are shown in FIGS. 1 and 5 and schematically in FIG. 6. Any beam directed along path 90 is redirected by a first adjustable reflecting means, preferably reflector 92, mounted within rotatable housing 94. The first reflector 92 directs the beam to a second adjustable reflecting means, preferably reflector 96, mounted within rotatable housing 98. A first motor 100 rotates housing 94 containing reflector 92 with respect to stationary housing 88 through gear assembly 102 and a second motor 104, only a portion of which is observable in FIG. 1, rotates housing 98 containing reflector 96 with respect to housing 94 through gear assembly 106. The adjustability of reflector 92 and reflector 96 enables the beam transmitter 34 to direct a laser beam to any position about the tubesheet 32, only a portion of which is shown in FIG. 1, where sleeving may be required.

The remote beam receiver 36 must be adjustable in order to receive the beam for transmission to the welding head. When the beam receiver 36 is properly aligned, the beam from the transmitter 34 will contact an adjustable reflecting means, preferably reflector 108, mounted within rotatable housing 110 and will be reflected to a second adjustable reflecting means, preferably reflector 112, mounted within rotatable housing 114, which will reflect the beam into non-rotating base portion 29 for reduction of the beam diameter by lenses 54 and 56 and for redirection to the laser welding head 26. Reflector 108 is adjusted when motor 116 rotates housing 110 with respect to housing 114 through gear assembly 118. Reflector 112 is adjusted when motor 120, only a portion of which is shown in FIG. 1, rotates housing 114 with respect to base portion 29, through gear assembly 122.

The beam must contact reflector 108 directly in the center and at the proper angle in order to be reflected to reflector 112, through base portions 29 and 28, and to the welding head 26. Initial alignment is performed using a viewing means, preferably a video camera 46, mounted on housing 47, which is attached to housing 98 of beam transmitter 34 and is movable therewith for viewing the position and orientation of beam receiver 36 through reflector 48. Next, the low-power laser 38 or other visible light source is activated, aligned as previously described with the path which the high-power laser will follow, and transmitted by beam transmitter 34. Upon exiting housing 98 along path 124, the beam strikes a pellicle means, such as pellicle 126, movably mounted on housing 98, preferably mounted in a housing 128 slidable out of the beam path on slides 130 by a hydraulic cylinder 131. Pellicle 126 directs a portion of the beam along path 132 and into contact with dual axis beam detector means, such as detector 40, which sends a signal identifying the contact point in X-Y coordinates. A signal indicative of contact by the beam with the center of beam detector 40 denotes that the beam has been properly directed by reflector 96 out of the beam transmitter 34. The balance of the beam continue along path 124. The percentage of the beam directed along path 132 can be adjusted by substituting a pellicle 126 of a different reflectivity. Preferably, about one-third of the beam is reflected along path 132.

Mounted to beam receiver 36 is a housing 134, preferably movable on slides 136 by a hydraulic cylinder 137, containing a second dual axis detector means, such as detector 42, and a partially reflecting mirror means, such as partially reflecting mirror 138. A portion of the beam traveling along path 124 passes through partially reflecting mirror 138 and strikes detector 42, which sends a signal identifying the contact point in X-Y coordinates. A signal indicative of a center strike indicates proper alignment while signals indicating off-center contact are used to adjust the beam transmitter 34 and receiver 36 for correct alignment. However, detector 42 cannot be used to indicate the angle of incidence of the beam with the beam receiver 36. A portion of the beam striking partially reflecting mirror 138 is reflected for this purpose. When the beam transmitter 34 and beam receiver 36 are properly aligned, this reflected portion will travel substantially back along path 124. A viewing means, preferably a video camera 49, mounted on housing 50 attached to housing 110 is used to observe the orientation of the reflected beam portion with respect to the beam transmitter 34 through reflector 51. When optimally aligned, the reflected portion will travel along path 124, contact pellicle 126, be reflected along path 140, and strike the center of a beam detector means, such as detector 44. A signal from detector 44 indicating in X-Y coordinates a contact point other than at the center is used to adjust the beam transmitter 34 and beam receiver 36. Lenses 142, 144 and 146 may be used to focus the beam before it contacts a detector for maximum accuracy. Filters may be substituted for lenses 142, 144, and 146 or used in conjunction therewith to remove undesirable wavelengths, e.g., from background lighting, before contact is made with any of the detectors 40, 42 or 44. When adjustment of reflectors 92, 96, 108 and 112 has been accomplished by motors 100, 104, 116 and 120 operating in response to signals from detectors 40, 42 and 44, the first phase of the alignment process has been completed.

The second alignment phase employs the high-power laser 18 and requires that the low-power detectors 40, 42 and 44 be moved out of the way, preferably by sliding housing 128 and 134 out of beam path 124 on slides 130 and 136 by actuating hydraulic cylinders 131 and 137, respectively. The visible beam from low-power laser 38 is turned off and the high-power laser 18 and partial beam reflector and intensity reducer 52 are activated. The high-power beam, which is reduced to about 5 to 10 percent of its full intensity by intensity reducer 52 is directed by mirror 86 to beam transmitter 34 and by reflectors 92 and 96 out of the beam transmitter 34. A first high-power beam detector means, preferably such as annular beam detector 148, which is observable in FIG. 6 and is shown in detail in FIG. 7, is positioned at the point of exit of the beam from housing 98 and detects whether than beam is exiting transmitter 34 off of reflector 96 at the proper angle. Annular detector 148, which is also called a wander ring, is made up of several thermal detectors 150, preferably four, and is sized so that the beam can pass through its center without contacting any of the detectors 150 but with only minimal clearance between the beam and the detectors. When properly directed out of transmitter 34, the beam does not contact any of the detectors 150. The wander ring may be alternatively sized so that the beam slightly contacts all of the detectors 150 when properly directed. A plate detector may be substituted for annular detector 148. The plate detector would have to be slid into beam path 124 for initial alignment purposes and removed for the balance of the alignment process.

A second high-power beam detector means, such as plate detector 152, is positioned adjacent beam receiver 36 in the beam path 124 and signals in X-Y coordinates the point of contact by the beam. A center strike indicates proper alignment. However, angular alignment must also be checked. For this purpose, housing 134 is slid back into beam path 124 to reflect a portion of the beam through partially reflecting mirror 138. When optimal alignment has been achieved, the reflected beam portion will pass back through annular detector 148 with no detector 150 being contacted by a beam traveling in either direction and with plate detector 152 indicating a center strike. Plate detector 152 must be positioned between partially reflecting mirror 138 and detector 42 to avoid damage to detector 42. Housing 134 and plate detector 152 are now slid out of beam path 124 and the laser system is properly aligned for laser welding. Annular detector 148 can be used during welding to ensure that the beam continues to exit transmitter 34 properly.

Since full beam power is required for welding, beam intensity reducer 52 must be deactivated. Intensity reducer 52 shown in FIG. 3 must be physically removed from the beam path. However, the preferred intensity reducer 52 of FIG. 4 need only be rotated to align aperture 82 with the beam path and locked in place, permitting the beam to pass therethrough at full intensity.

The Laser Welding Head Apparatus

FIGS. 1, 8, 9 and 10 depict the preferred laser welding heat apparatus 24. A plate 25 is positioned beneath the tubesheet 31 by a robotic arm 30 which attaches to plate 25 at ring 37. Three linear potentiometers 19, which are observable in FIGS. 8 and 9, send a signal when they are depressed by contacting tubesheet 31, enabling level positioning of plate 25 beneath tubesheet 31. The weld head 26 is aligned with the bottom of the tube 14 to be repaired and camlocks 27 are extended within nearby tubes by cylinders 21, which may be hydraulic or pneumatic, and locked to support the apparatus. A stationary base portion 29 is attached to plate 25 and a sliding base portion 28 rides up and down on slides 32, which are attached to plate 25, when lead screw 33 is rotated by motor 35, causing the laser weld head 26, which is attached to sliding base portion 28, to be axially inserted into the tube 14 to the weld site. The laser beam is directed by reflector 112 into base portion 29. The laser beam strikes a reflector means within base portion 29, such as reflector 113, which causes the beam to pass through lenses 54 and 56 which reduce the diameter of the beam. The beam is preferably 0.625 inches to 0.75 inches (15.88 to 19.05 mm) in diameter before passing through lenses 54 and 56 and 0.250 inches to 0.3125 inches (6.35 to 7.94 mm) afterwards. The unreduced beam diameter could not be accommodated by the laser welding head 26.

Beam receiver 36 depicted in FIGS. 1, 8, 9 and 10 can be used for welding sleeves within most tubes in the tubesheet 31. Some tubes cannot cannot be accessed by this device since cylinder 137 would contact channel-head 16 before the welding head 26 could be aligned with the entrance of the preselected tube to be sleeved. For welding within these tubes, a second beam receiver (not shown) is preferably employed. This second beam receiver is provided with all of the same components as beam receiver 36. However, referring to FIG. 1, stationary base portion 29 would preferably be located on the left side of sliding base portion 28 rather than on the right side as depicted. Housing 110 and 114, camera 49, and cylinder 137 would also extend to the left of sliding base portion 28 as viewed in FIG. 1, enabling the welding head 26 to be aligned with the entrance of nearly all of the tubes in the tubesheet 31.

Figure 11:
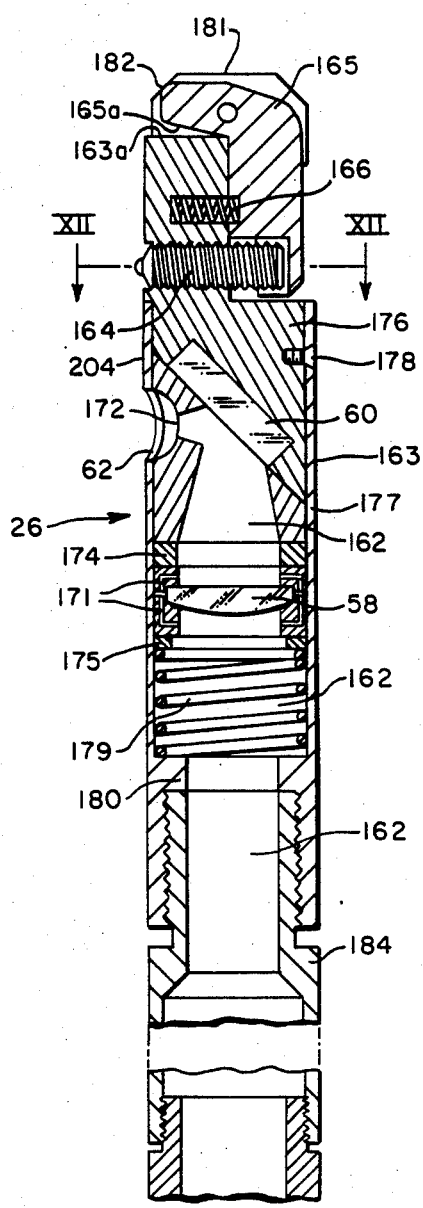
FIG. 11 is a cross-sectional view in elevation of the preferred laser welding head.

The beam exits base portion 29 into sliding base portion 28 through window 154, which is preferably made of zinc selenide and acts to contain shield gas within sliding base portion 28. Within sliding base portion 28, the beam is preferably reflected by reflector 156 to a beam directing means, preferably a reflector 158, which directs the beam through a hollow cylinder member 160 rotatably connected to base 28 which leads to the laser welding head 26 shown in detail in FIG. 11. The beam passes through a central hollow portion or cavity 162 within cylindrical housing 163 of welding head 26, is focused by a focusing means, preferably lens 58, and directed by a welding mirror means, such as mirror 60, out of head 26 through discharge outlet 62. While a welding head having a solid cylindrical housing is preferred, a cage or other means for supporting a mirror and lens could be substituted.

Figure 12:
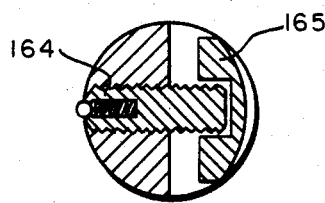
FIG. 12 is a cross-sectional plan view taken along the line XII—XII in FIG. 11 which depicts the focal distance maintaining means.

The laser beam must be focused on the area to be welded. After traveling through the focusing lens 58 which is preferably made of zinc selenide, the beam is reflected by welding mirror 60, which is preferably made from silver coated copper or polished molybdenum, to the weld location. A focal distance maintaining means is required to maintain the weld head 26 and the welding mirror 60 mounted therein a predetermined distance from the inner wall of the sleeve within the tube to keep the beam focused on the inner sleeve wall for welding thereof. The preferred focal distance maintaining means, which is most clearly shown by the cross section of head 26 depicted in FIG. 12, employs a ball plunger 164 consisting of a spring loaded ball, preferably made of steel, and a means for maintaining the ball plunger 164 in contact with the inner wall of the sleeve, such as a toggle arm 165 loaded against the inside wall of the sleeve by a spring 166. The toggle arm 165 is preferably made of steel or a ceramic material to resist the high temperatures encountered during sleeve welding. The spring 166 preferably provides $\frac{1}{4}$ to $\frac{1}{2}$ pound of force for continually urging ball plunger 164 against the inner wall of the sleeve during rotation of the weld head 26, thereby maintaining the cylindrical housing 163 and the welding mirror 60 therein a predetermined distance from the inner sleeve wall. The toggle arm 165 is limited in its range of travel by contact with an upper portion of the toggle arm 165a with a portion of cylindrical housing 163a. The ball plunger is preferably provided with 2 to 5 pounds of force to resist movement except when severe tube restrictions are encountered.

An alternative embodiment of the focal distance maintaining means, which is depicted in FIGS. 13 and 14, employs at least two spring loaded compression pins 167 to urge a roller 168 into contact with the inner sleeve wall. The roller 168 enables the head to be rotated within the sleeve while springs 169 within pins 167 maintain the roller 168 in engagement with the inner sleeve wall, thereby maintaining the welding mirror 60 a predetermined distance from the inner sleeve wall for focusing thereon by lens 58.

Inert gas, such as helium, argon, or a mixture of the two, is supplied to the welding head 26 to act as shield gas for the weld to prevent weld contamination by oxygen, hydrogen, and other harmful contaminants. The gas is supplied to base 28 through a line (not shown) to an inlet 170 observable in FIG. 9, travels along a shield gas flow path which directs the gas upwardly within cylindrical member 160 into cavity 162, passes against and about the periphery of lens 58 through gas flow pasages 171 into contact with mirror 60 and out of recessed aperture 172 in discharge outlet 62. The shield gas provides equally distributed cooling for lens 58 and mirror 60 before exiting head 26.

Discharge outlet 62 opens outwardly from recessed aperture 172 in a conical or bell-shaped manner. This expanded opening from the recessed aperture 172 aids in distributing the shield gas over the weld location and prevents smoke and gases generated by the laser welding from obstructing the path of the laser. Ball plunger 164 maintains head 26 a slight predetermined and adjustable distance from the inner sleeve wall, providing an annulus through which smoke and gases are flushed away from the weld location. The small size and recessed positioning of aperture 172 also serves to minimize splattering of molten metal into cavity 162 and onto mirror 60 or lens 58.

The focal point of lens 58 can be changed by replacing spacers 174 and 175 with different size spacers. The upper housing portion 176 can be removed from the lower housing portion 177 after retaining screw 178 has been threaded out. When reassembled, the spacers and lens 58 are maintained in position by spring 179 loaded against ledge 180 of lower housing portion 177. The tip 181 of upper housing portion 176 is preferably provided with a taper 182 for ease of insertion into the end of a tube.

Head 26 may be rigidly extended from cylindrical member 160 of base portion 28 through connector 184 attached to cylindrical housing 163. Since the sleeve must be welded near its top and bottom, with the bottom usually being within tubesheet 31 and the top being 30 to 60 inches within tube 14, the preferred embodiment of the weld head apparatus requires an axial positioning means capable of positioning the head 26 at various distances from the tubesheet 31. The preferred axial positioning means contemplates the substitution of extension connectors 184 of various lengths to couple cylindrical housing 163 to cylindrical member 160 with longer connectors 184 acting to space head 26 a greater distance from base portion 28.

Since leak-tight welding of the sleeve to the tube requires a weld path circumscribing the sleeve periphery, a welding head rotating means is required. The preferred welding head rotating means, which is observable in FIGS. 8 and 9, employs a motor means, such as motor 66 attached to base portion 28 through motor mount 186. The motor means rotates weld head 26 through a drive means such as the gear assembly described herinafter. Affixed to motor shaft 188 is drive gear 190, which meshes with driven gear 192. Since driven gear 192 is fixedly attached to cylindrical member 160, which is rotatably attached to base portion 28, rotation of gear 190 through activation of motor 66 causes cylindrical member 160 to rotate. Cylindrical housing 163 is made to rotate with cylindrical member 160 through the non-rotational connection therebetween or, when welding the upper sleeve joint, through the connection provided by connector 184.

An overlapping helical weld pattern has been found to be preferred to a single pass weld. Therefore, an advancing means for continuously advancing the welding head a distance slightly less than the width of the weld in each revolution of the welding head is needed. The preferred advancing means, which is observable in FIG. 8, consists primarily of a bushing 194 non-rotatably attached to base portion 28 and having internal threads which engage external threads about a portion of cylindrical member 160. This screw-type advancing mechanism translates cylindrical member 160 upward or downward with respect to bushing 194 and base portion 28 when cylindrical member 160 is rotated, resulting in corresponding axial movement of the welding head 26 and providing a helical weld path.

An alternative preferred multiple pass weld consists of discrete single pass welds closely spaced from each other. For this type of weld, an advancing means which axially indexes the weld head a distance slightly grater than the width of the weld is required. While not shown, such an advancing means could be hydraulic, pneumatic, or mechanical and would replace the screw-type advancing mechanism described above.

Laser Sleeve-To-Tube Welding

Due to the power losses associated with transmitting a laser beam to a remote location as well as power losses inherent in optical systems, it is recommended that the laser 18 be located as near to the workpiece as possible. Since access to the steam generator of a nuclear plant is restricted, most high-power lasers commercially available could not be used for sleeve-to-tube welding. Also, the minimum delivered power of about 500 watts rules out other available laser systems. While a $CO_2$ laser is preferred, any laser capable of delivering 500 watts to the welding head 26 could be used. The preferred laser will be transportable to a site adjacent the manway 24 of the steam generator 16 and will produce an 800 watt laser beam. Such a laser is currently manufactured by Laser Corporation of America, Wakefield, Mass.

Many different lens and mirror materials could be used in the hereinbefore described beam alignment and transport system. The preferred material for lenses and windows is zinc selenide. However, potassium chloride, sodium chloride, and potassium bromide are among other known acceptable lens and window materials. The preferred mirror materials include polished copper, molybdenum, tungsten, or copper coated with silver. Pellicles are preferably made of a thin plastic sheet stretched taut and coated with a partially reflective coating. However, other conventional pellicles or beam splitters can be employed.

The reflectivity of the inner wall of the sleeve at low temperatures makes it advisable to bring the laser up to full power immediately for fast heating of the wall to minimize reflection of the high-power beam and the potential resulting damage to the optical system components. However, abrupt shut off of the laser can have detrimental effects on the weld. Ramping down of the laser power into the 400–500 watt range before shut off has been found ot minimize weld imperfections. Therefore, the preferred power curve of the laser during sleeve-to-tube welding is as depicted in FIG. 15.

Once the laser has been set up, the robotic arm 30 has positioned the laser welding head 26 beneath the entrance to sleeve 12 to be welded within the defective tube 14, and the camlocks 27 have been actuated, the system must be aligned. FIG. 2 depicts a low-power laser 38, preferably a HeNe laser, which emits visible light useful for rough alignment purposes. The low-power beam 68 contacts pellicle 70, which reflects a portion, preferably about 50 percent, of the beam along path 72, from which it is directed by steering mirrors 74 and 76 into contact with partial beam reflector and intensity reducer 52. The visible beam is observable by video camera 45, around opaque disk 78 and through pellicle 70, which appears semi-transparent to the low-power beam. The video camera 45 is useful in adjusting pellicle 70 to reflect beam 68 along the proper path 72 for reflection by beam reflector 52 along high-power beam path 22.

After striking a reflective portion of reflector 52, the preferred reflector being depicted in FIG. 4 and an alternative reflector being depicted in FIG. 3, the low-power beam is directed along high-power beam path 22. The beam 68 is then directed by mirror 86 within stationary housing 88 along path 90 to beam transmitter 34 as observable in FIG. 1. A first adjustable reflector 92, within rotatable housing 94 reflects the beam to a second adjustable reflector 96, within rotatable housing 98, which directs beam 68 out of beam-transmitter 34. Video camera 46 is used to observe the beam through reflector 48 for adjustment of the beam exit path to align the transmitter 34 to direct the beam to the beam receiver 36. Motor 100 rotates housing 94 through gear assembly 102 to adjust the path of beam 68 after striking reflector 92 and motor 104 rotates housing 98 through gear assembly 106 to adjust the path of the beam after reflection by reflector 96.

The remote beam receiver 36 also comprises two rotatable housing 110 and 114 within which are mounted adjustable reflectors 108 and 112. Motors 116 and 120 rotate housings 110 and 114 through respective gear assemblies 118 and 122. Mounted in the optimum beam path is a partially reflecting mirror 138. A video camera 49 is mounted on housing 50 attached to housing 110 to view transmitter 34 through reflector 51.

Once the visible laser 38 has been actuated and aligned by video camera 45 for reflection by reflector 52 along beam path 22, the beam transmitter 34 and receiver 36 can be roughly aligned through cameras 46 and 49. Camera 46 observes the course of beam 68 after exiting transmitter 34 and permits adjustment of reflectors 92 and 96 through rotating housings 94 and 98 for direction of beam 68 to partially reflecting mirror 138. If beam receiver 36 is properly aligned for beam reception, a portion of the beam will be reflected back to beam transmitter substantially along the same path. Camera 49 is used to adjust alignment of housings 110 and 114 until the beam portion is so reflected. Housings 94 and 98 may have to be readjusted for the beam to strike the partial reflecting mirror 138 after its repositioning.

Once roughly aligned, laser detectors are used for a more precise alignment. As beam 68 exits housing 98, it strikes pellicle 126, which diverts a portion of the beam along path 132. If the beam is leaving the beam transmitter along the optimum path, the pellicle 126 will direct a portion of the beam into contact with the center of beam detector 40. Beam detector 40, which is preferably of the pyroelectric type, transmits a signal indicative in X-Y coordinates of the location of beam contact for use in adjusting the beam exit path, such as by moving reflectors 52 or 86.

The remaining portion of the low-power beam contacts partially reflecting mirror 138, which permits a portion of the beam to pass through and, when properly aligned, contact the center of detector 42. Laser detector 42, also preferably of the pyroelectric type, sends a signal indicating the strike location in X-Y coordinates for use in adjusting the receiver and transmitter to achieve a center strike on detector 42. The remaining portion of the beam is reflected by partially reflecting mirror 138. When properly aligned, the beam portion will travel substantially back along its path of transmission, contact pellicle 126, and be directed along path 140, striking detector 44 in its center. The preferably pyroelectric detector 44 also sends an X-Y signal pinpointing the strike location for use in further adjusting transmitter 34 and receiver 36. Lenses 142, 144 and 146 are used to focus the beam portions on detectors 40, 42 and 44 respectively for precise strike location capability. The detectors are accurate to approximately 0.00014 inches (0.0036 mm).

With rough alignment by low-power laser completed, alignment with the high-power laser itself is preferred to ensure optimum transmission and reception of the high-power beam. Low-power laser detectors 40, 42 and 44 are moved out of the beam path to prevent damage thereto. Preferably, these detectors, the pellicle 125, and the partially reflecting mirror 138 are mounted in sliding housings, such as those illustrated in FIGS. 1, 5, 6 and 10 as housings 128 and 134, for each of movement along slides 130 and 136 by hydraulic cylinders 131 adn 137 respectively. A plate detector 152 is slid into position in place of partially reflecting mirror 138. Beam intensity reducer 52 is rotated by a motor (not shown) and high-power laser 18 is activated. Beam intensity reducer 52 permits passage of about 5 to 10 percent of the beam along path 22 for use in alignment, the balance of the beam being directed to a conventional beam dump 84. Use of the laser at full power could damage components, including the plate detector 152, which cannot withstand a sustained direct strike thereby. However, the beam emitted by operation of the laser at a lower power setting may not behave the same as a beam at the higher setting to be used for welding, leading to an inaccurate alignment. Therefore, the beam intensity reducer is used to transmit only a portion of the high-power beam for alignment purposes.

Figure 6:
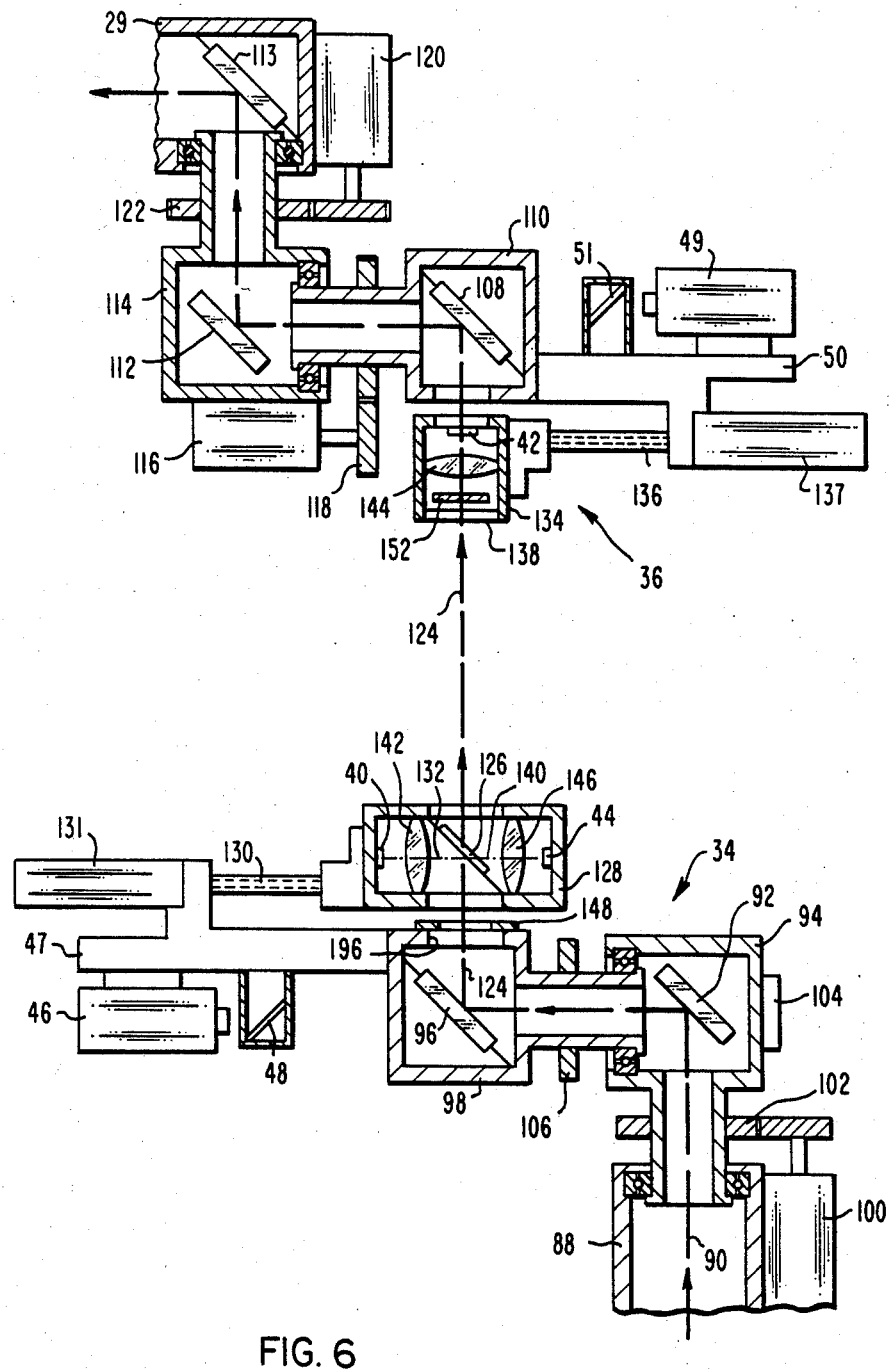
FIG. 6 is an elevational view partly in cross section of the preferred beam transmitter and beam receiving means.
Figure 8:
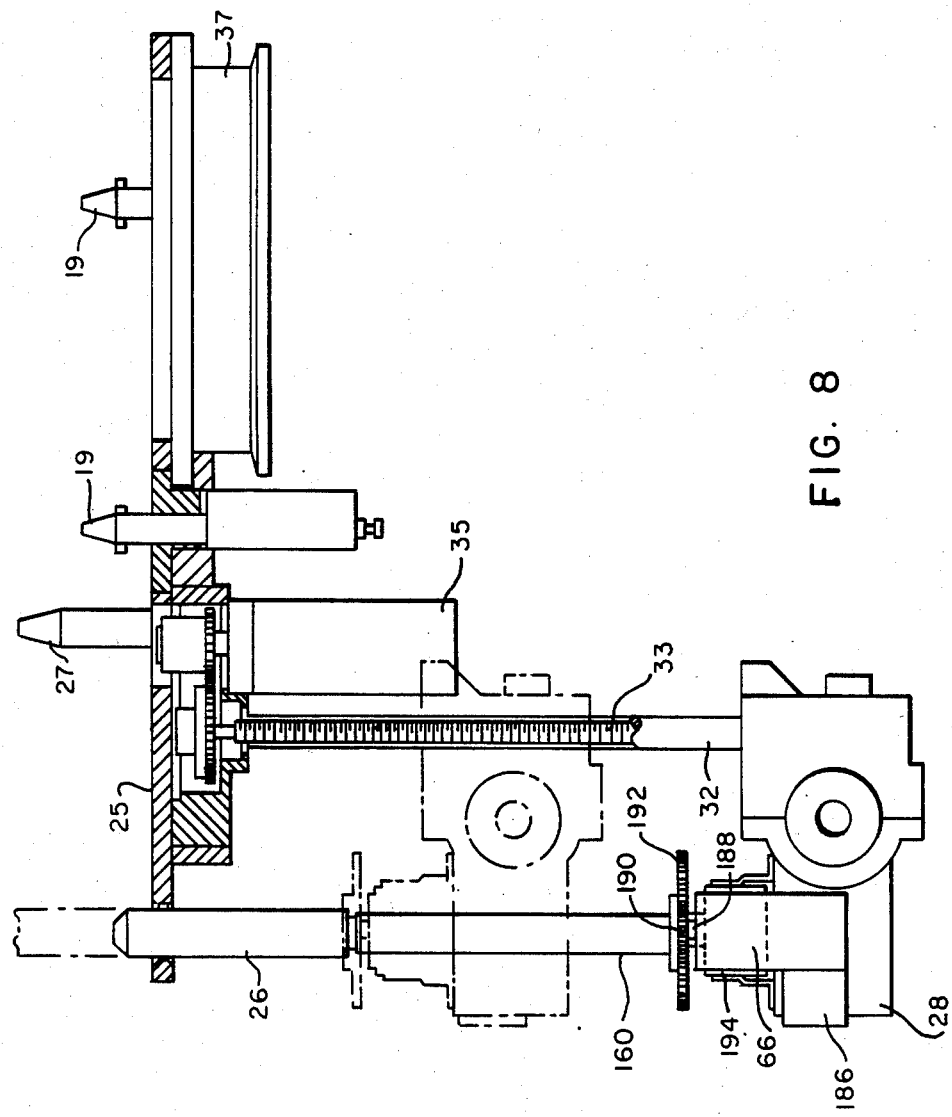
FIG. 8 is an elevational view partially in cross section and with parts broken away of the plate, sliding base portion, and welding head.
Figure 9:
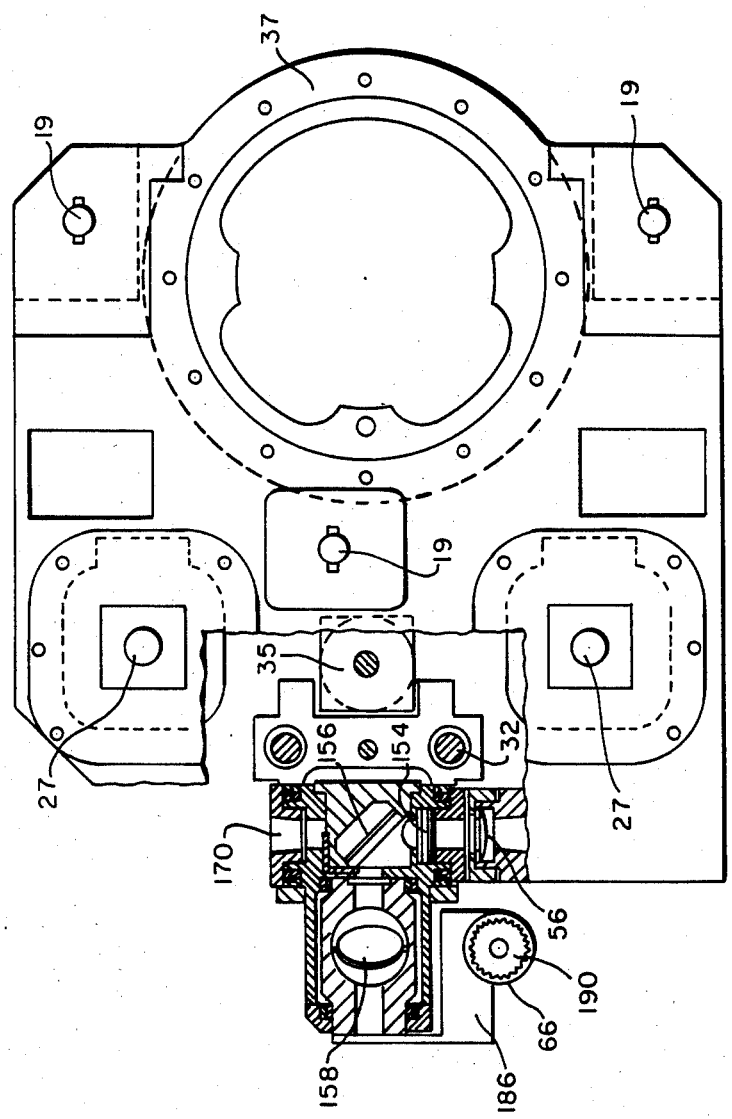
FIG. 9 is a plan view with parts broken away of the plate and sliding base portion.
Figure 10:
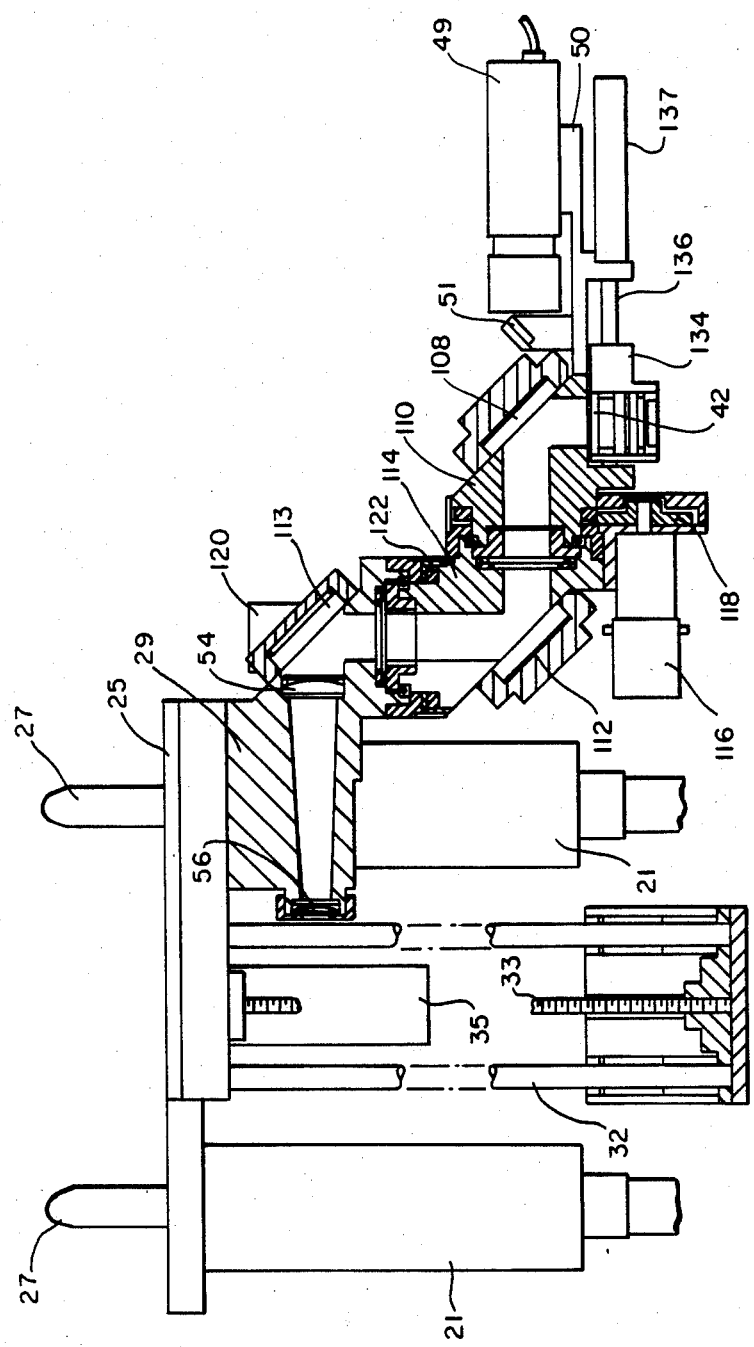
FIG. 10 is an elevational view partially in cross section of the preferred beam receiver.

A second high-power laser detector, such as annular detector 148, which is also referred to as a wander ring and appears as in FIGS. 6 and 7, is used to ensure that the beam exits housing 98 through the center of aperture 196 and signals in X-Y coordinates the beam position. The beam then travels along beam path 124 and contacts plate detector 152. Plate detector 152, which is preferably made up of wedge-shaped high temperature thermocouples which meet at the center, sends a signal indicative of the X-Y position of the strike point of the beam. Partially reflecting mirror 138 is slid into beam path 124 with plate detector 152 as a back up to protect low-power detector 42. A portion of the high-power beam is reflected by partially reflecting mirror 138 and, when beam transmitter 34 and beam receiver 36 are optimally aligned, travels substantially back along beam path 124 and back through the center of annular detector 148. Detector 148 sends a signal indicative of the position of the beam passing therethrough. Once the signals from detectors 148 and 152 have been used to align the beam transmitter 34 and beam receiver 36 for transmission of a laser beam along an optimum beam path and for optimum reception of the beam, alignment is complete and the high-power laser 18 is turned off.

Preferably, the intensity of the beam from high-power laser 18 is not reduced for actual welding of a sleeve within a tube. When a beam intensity reducer 52 such as the one depicted in FIG. 4 is used, aperture 82 is rotated into beam path 22 so that the beam can pass at full intensity therethrough. If a beam intensity reducer 52 like that of FIG. 3 is employed, it must be removed from the beam path for welding.

Motor 66 is then actuated, rotating motor shaft 188, which turns attached drive gear 190. Driven gear 192 is rotated by drive gear 190, causing attached cylindrical member 160 to rotate. Weld head 26 rotates through coupling of cylindrical housing 163 to cylindrical member 160 or, when welding of the upper sleeve-to-tube joint, through coupling of housing 163 to cylindrical member 160 by extension connector 184. A shielding gas, preferably helium is supplied to base portion 28 through inlet 170, travels through hollow cylindrical member 160 to cavity 162, around the periphery of mirror 58 through apertures 171, and out of recessed aperture 172 of discharge outlet 62 into contact with sleeve 12.

Laser 18 is then actuated at full welding power, preferably 700–800 watts, as previously described. The high-power beam travels along path 22, is redirected along path 90 by reflector 86, reflects off of reflector 92 to reflector 94, is transmitted along bath path 124 to reflector 108 which reflects the beam to reflector 112 which directs the beam into laser welding base portion 29. Reflector 113 diverts the beam through lenses 54 and 56 which reduce the diameter of the beam before it is redirected by reflectors 156 and 158 through hollow cylindrical member 160 into cavity 162 within cylindrical housing 163. The beam is focused by lens 58 and reflected out of welding head 26 through recessed aperture 172 of discharge outlet 62 into contact with sleeve 12.

Figure 16:
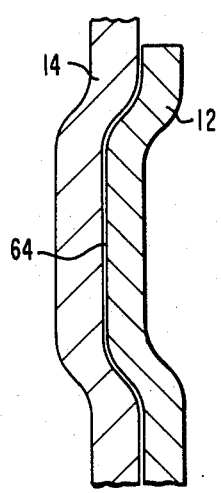
FIG. 16 is an enlarged cross-sectional view in elevation of a planned weld site after expansion of the sleeve into contact with the tube.

FIG. 16 is an enlarged cross-sectional view of the sleeve 12 and tube 14 at a planned weld site 64 near the top of sleeve 12. The sleeve is expanded into contact with the tube at site 64 through hard rolling, hydraulic expansion, or other expansion methods. However, spring back of the sleeve material can lead to a slight gap at the sleeve-to-tube interface at site 64. While sleeve brazing operations can tolerate only a very small range of gap size, an effective weld joint can be created by laser welding with up to an 0.008 inch gap present. Also, brazing requires a relatively clean surface for uniform braze flow, usually necessitating a honing or other cleaning operation before brazing. An effective laser weld joint can be produced despite significant surface oxidation.

Many nuclear steam generators employ Inconel tubes with thicknesses ranging from 0.040 to 0.055 inches (1.02 to 1.40 mm). The preferred sleeving material for these tubes is Inconel with a wall thickness of about 0.040 inches (1.02 mm). A focal distance maintaining means, such as ball plunger 164 and spring loaded toggle arm 165 depicted in FIGS. 11 and 12, rotatably supports the weld head 26 within the sleeve 12 with the outer edge 204 of housing 160 a fixed predetermined distance from the inner wall of sleeve 12 thereby maintaining welding mirror 60 a predetermined distance from the inner wall of sleeve 12. Lens 58 and mirror 60 cooperate to direct the high-power beam against the sleeve and to focus the beam at a point preferably 0.020 to 0.030 inches (0.51 to 0.76 mm) beneath the inner sleeve wall, e.g., one-half to three-fourths of the way through sleeve 12.

Figure 17:
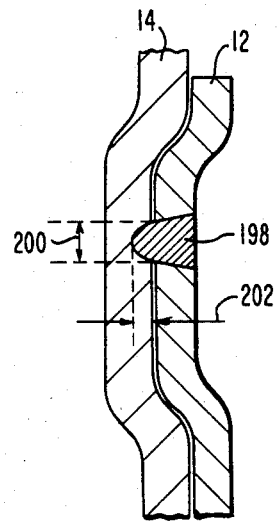
FIG. 17 is an enlarged cross-sectional view in elevation of a weld between a sleeve and tube according to the invention.

FIG. 17 represents in cross section a typical weld 198 made using the weld head apparatus. The two most important weld parameters are weld width 20 at the interface 64 between the sleeve 12 and tube 14 and weld depth 202 or penetration into the tube 14. The preferred weld width at interface is at least 0.046 inches (1.17 mm) while the ideal weld depth is at least 0.025 inches (0.64 mm). To achieve these optimum weld parameters, the laser power delivered to the weld site should be between 500 and 700 watts and the laser beam should travel across the weld surface at 7.5 to 15.0 inches per minute (190.5 to 381.0 mm/min.), thereby delivering a specific energy of 2600 to 5300 joules/inch (102.4 to 208.7 joules/mm). The preferred ranges are 600 to 700 watts delivered at 10.0 to 12.5 inches/min. (254.0 to 317.5 mm/min.) which corresponds to a preferred rotational speed of weld head 26 of 4.0 to 7.5 rev./min. which could vary depending on the diameter of the tube and sleeve and the delivered laser power. Too slow of a weld head rotation could deliver excessive specific energy to the weld site, which could cause the laser to burn through the tube wall. Too rapid rotation of weld head 26 could prevent uniform fusion of sleeve 12 to tube 14.

The weld 198 is shielded from contamination by a shield gas, preferably Helium, which exits weld head 26 through recessed aperture 172 and fills the inside of sleeve 12 and part of tube 14. The conical shape of discharge outlet 62 from recessed aperture 172 to the outer surface 204 of weld head 26 acts to prevent molten weld pool material from splattering into weld head 26 through aperture 172, which would damage mirror 60 and lens 58.

Figure 18:
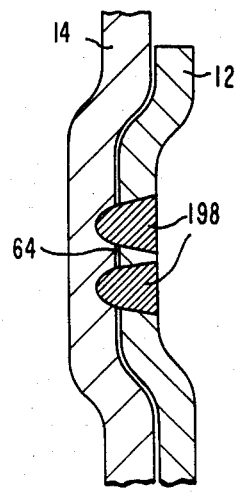
FIG. 18 is an enlarged cross-sectional view in elevation of two discrete welds on one end of a sleeve.
Figure 19:
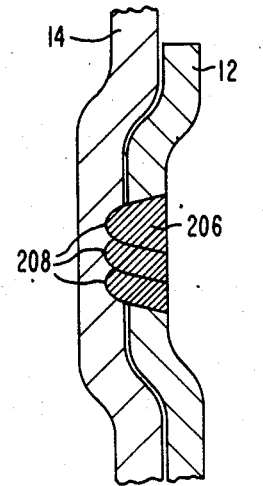
FIG. 19 is an enlarged cross-sectional view in elevation of a helical weld path made with three passes.

A single weld pass within the sleeve creates a leak-tight joint between the sleeve and tube along a weld path. However, multiple weld passes are preferred to insure leak tightness and sufficient weld strength for reinforcement of degraded tubes. Two preferred methods of multiple pass sleeve welding are depicted in FIGS. 18 and 19. FIG. 18 shows two discrete welds 198 in cross section, each one of which extends about the entire sleeve periphery at interface 64. After one weld path has been completed, the laser weld head is indexed up or down a distance greater than the weld width at the interface and a second pass is performed. Additional passes are not detrimental. FIG. 19 represents a weld 206 made by a continuous helical weld path circumscribing the inside of the sleeve three times with each pass overlapping the previous weld at the interface preferably by at least 0.005 inches (0.13 mm). The distinct weld roots 208 of each weld are observable. Two or more rotations may be required for a helical weld of acceptable width at interface 64. A third preferred embodiment would have two or more discrete weld passes which overlap at interface 64 by at least 0.005 inches (0.13 mm). While the welds thusly produced would appear in cross section similar to the welds of FIG. 19, the weld passes would not be helical in this embodiment. All three of the multiple weld pass types described above produce acceptable welds. As depicted in FIG. 15, the laser power is ramped down to about 500 watts delivered before the laser is shut off.

After one end of the sleeve has been welded to the tube, the weld head must be indexed within the tube to joi the other end of the sleeve to the tube. Under the preferred method of indexing of the weld head 26 to the end of the sleeve farther within tube 14, an extension connector 184 of a predetermined length is inserted between the cylindrical housing 163 and cylindrical member 160 and acts raise the welding head 26 within the tube as required. Following welding of each end of the sleeve, the weld head is removed from tube 14 by robotic arm 30 and repositioned within the next tube which requires repair for sleeve welding therein.

While preferred embodiments of the invention have been disclosed herein, many modifications thereof are possible. This invention should not be restricted except insofar as is necessitated by the spirit of the prior art.

We claim:

1. A laser welding head apparatus for welding a sleeve within a tube by fusing the interface therebetween with a laser beam, said apparatus comprising:
  cylindrical housing means adapted to be inserted axialy into the sleeve and having an opening in one end thereof, discharge outlet means in a side thereof, and a hollow portion extending axially from the opening in communication with the discharge outlet means;

focusing lens means mounted within the hollow portion of said housing means between the opening and the discharge outlet means for focusing a laser beam directed through the hollow portion;

welding mirror means mounted within the hollow portion of said housing means proximate the discharge outlet means for reflecting a laser beam focused by said focusing lens means within said cylindrical housing means through the discharge outlet means and into contact with the sleeve for fusion of the sleeve to the tube;

focal distance maintaining means for maintaining said welding mirror means a predetermined distance from the inside surface of the sleeve; and welding head rotating means for rotating said cylindrical housing means of the welding head apparatus to circumscribe a weld path about the inside wall of he sleeve with the laser beam for joining the sleeve to the tube by fusing the interface therebetween.

2. The laser welding head apparatus according to claim 1, further comprising a shield gas flow path means for directing shield gas through said cylindrical housing means of the weld head apparatus and for discharging shield gas through the discharge outlet means into contact with the sleeve to shield the weld path.

3. The laser welding head apparatus according to claim 2, wherein the discharge outlet means has a recessed discharge aperture means to prevent metal melted by the laser beam from splattering through the discharge outlet means and onto said mirror means, the discharge outlet means opening in a substantially conical manner outwardly from the recessed aperture means to larger dimensions for distributing the shield gas over the weld path.

4. The laser welding head apparatus according to claim 3, wherein said shield gas flow path means includes gas flow passage means about the periphery of said focusing lens means for causing the shield gas flowing through said housing means to contact said focusing lens means for cooling purposes.

5. The laser welding head apparatus according to claim 4, further comprising a base, said base supporting a beam directing means comprising a beam directing mirror adjustably attached to said base for accepting a laser beam transmitted thereto and for redirecting the beam substantially through the center of the tube and into said housing means.

6. The laser welding head apparatus according to claim 5, wherein said focal distance maintaining means comprises a ball plunger means attached to said housing axially in line with the discharge outlet means, said focal distance maintaining means further comprises a spring-loaded toggle arm means for maintaining the ball plunger in contact with the inner sleeve wall, the ball plunger being fixedly mounted with respect to the radius of said cylindrical housing means to position the outer edge of the discharge outlet means a predetermined distance from the inner wall of the sleeve to maintain said welding mirror means a predetermined distance from the inner sleeve wall.

7. The laser welding head apparatus according to claim 6, wherein said weld head rotating means comprises a motor means and a drive means, the drive means comprising a drive shaft rotated by said motor means, the drive shaft having a drive gear fixedly attached thereon for rotation therewith, the drive gear meshing with a driven gear fixedly attached to said cylindrical housing means for rotation of said housing means when the motor means rotates the drive shaft.

8. The laser welding head apparatus according to claim 7, said apparatus further comprising axial positioning means for axially positioning said housing means a predetermined distance within the tube to the weld path.

9. The laser welding head apparatus according to claim 8, said apparatus further comprising an axial translating means for continuously axially translating said housing means as it is rotated within the sleeve, the translating means acting to move said housing means a distance less than the width of the weld path in each rotation of said housing means, said translating means creating an overlapping helical weld path between the sleeve and tube.

10. The laser welding head apparatus according to claim 8, said apparatus further comprising axial translating means for axially translating said housing means a predetermined distance within the sleeve for causing the weld head apparatus to weld along a second discrete weld path adjacent the first weld path.

11. A laser weld head apparatus for welding a sleeve within a preselected tube of a nuclear steam generator, the nuclear steam generator having a plurality of tubes supported upon a tubesheet and extending transversely therefrom, the sleeve being in close contact with the preselected tube at least at predetermined weld areas, said apparatus comprising:

a supporting plate means adapted to be positioned beneath the tubesheet at the location of the preselected tube;

supporting means for supporting said plate means beneath the tubesheet at the location of the preselected tube;

axially translatable base means attached to said plate means and operative to be translated transversely with respect to said tubesheet;

laser welding head means comprising a focusing means and a welding mirror means, said welding head means being rotatably attached to said axially translatable base means and operative to be axially inserted into the preselecetd tube by said base means, the focusing means being operative to focus a laser beam directed to said welding head means, the welding mirror means being operative to direct a laser beam focused by the focusing means into contact with the sleeve to melt through the sleeve and to melt partially through the tube to fuse the sleeve to the tube; and welding head rotating means for rotating the welding head means within the tube to fuse the sleeve to the tube about a weld path extending around the periphery of the sleeve.

12. The laser weld head apparatus according to claim 11, further comprising shield gas flow path means for directing shield gas through said weld head to the weld areas during welding.

13. The laser weld head apparatus according to claim 12, wherein said welding head means further comprises a focal distance maintaining means for maintaining the welding mirror means a predetermined distance from the inner sleeve wall.

14. The laser weld head apparatus according to claim 13, further comprising axial indexing means for axially indexing the welding head means from one predetermined weld area to another predetermined weld area.

15. A laser welding head apparatus for fusion welding of a sleeve within a tube of a steam generator, the sleeve having been expanded into close contact with the tube in the predetermined areas to be welded, said apparatus comprising:
- a base;
- a hollow cylindrical member attached to said base and adapted to be inserted into a steam generator tube;
- a beam directing means for directing a laser beam transmitted to said beam directing means through said hollow cylindrical member, said beam directing means comprising a beam directing reflector adjustably attached to said base;
- a cylindrical housing means attached to said cylindrical member, said housing means having an opening in the end of said housing means attached to said cylindrical member, said housing means also having a hollow portion in communication with the opening for accepting a laser beam transmitted to said beam directing means and directed by the beam directing reflector through said cylindrical member and into said cylindrical housing means through the opening, said housing further having a discharge outlet means in communication with the hollow portion through which the laser beam exits said housing means into contact with the sleeve;
- a focusing lens means mounted within the hollow portion of said housing means between the opening and the discharge outlet means for focusing the laser beam directed through the opening and into the hollow portion;
- a welding mirror means mounted within the hollow portion proximate the discharge outlet means for redirecting a laser beam focused by said focusing lens means out of said housing means through the discharge outlet means and into contact with the sleeve for melting through the sleeve and partially through the tube to join the sleeve to the tube through fusion;
- focal distance maintaining means for maintaining said welding mirror means a predetermined distance from the inside surface of the sleeve;
- welding head rotating means for rotating said housing means within the sleeve for welding the sleeve to the tube along a weld path about the periphery of the sleeve; and
- a shield gas flow path means for directing a shielding gas to the weld areas, said flow path means comprising said hollow cylindrical member, the opening, the hollow portion of said housing means, and the discharge outlet means.

16. The laser welding head apparatus according to claim 15, wherein said shield gas flow path means further comprises gas flow passage means provided about the periphery of said focusing lens means for directing the flow of shield gas into contact with said focusing lens means and past said focusing lens means along the periphery thereof, the shield gas acting to cool said focusing lens mans.

17. The laser welding head apparatus according to claim 16, wherein the discharge outlet means has a recessed discharge aperture to prevent metal melted by the laser from splattering through the discharge outlet means and into contact with the welding mirror means.

18. The laser welding head apparatus according to claim 17, wherein the discharge outlet means opens substantially conically outwardly from the recessed aperture to direct the shield gas over the weld areas.

19. The laser welding head apparatus according to claim 18, wherein said focal distance maintaining means comprises a ball plunger means fixedly attached at a predetermined location along the periphery of said housing axially in line with the discharge outlet means, said focal distance maintaining means further comprising a spring-loaded toggle arm means for continually urging the ball plunger means against the inner wall of the sleeve to maintain the discharge outlet means and the welding mirror means at predetermined distances from the inner sleeve wall.

20. The laser welding head apparatus according to claim 19, wherein said welding head rotating means comprises a motor with a drive shaft, the drive shaft having a drive gear fixedly attached thereon for rotation therewith, the drive gear meshing with a driven gear fixedly attached to said cylindrical member for rotation of said cylindrical member and said attached cylindrical housing means when the drive shaft is rotated by actuation of the motor.

21. The laser welding head apparatus according to claim 20, further comprising axial positioning means for axially positioning said housing means to the welding areas, said axial positioning means comprising the connection of a predetermined length cylindrical extension connector means between the cylindrical member and said cylindrical housing to establish a fixed distance between said base and said cylindrical housing means.

22. The laser welding head apparatus according to claim 21, said apparatus further comprising an axial translating means for moving said housing means axially as said housing means is rotated by said weld head rotating means, said translating means acting to axially translate said housing means a distance less than the width of the weld path in each rotation of said housing means, thereby creating an overlapping helical weld path between the sleeve and tube.

23. The laser welding head apparatus according to claim 22, wherein said axial translating means comprises an internally threaded bushing fixedly attached to said base, said cylindrical member having external threads which cooperate with the internal threads of the bushing so that rotation of said cylindrical member by said head rotating means acts to axially translate said cylindrical member and said attached cylindrical housing a distance of one thread pitch per revolution.

24. The laser welding head apparatus according to claim 20, said apparatus further comprising an axial translating means for moving said housing means a predetermined distance from the weld path for welding along a second weld path adjacent to but not in contact with the first weld path.

* * * * *